Nov. 4, 1924.
A. TILDEN
1,514,271
CUTTING AND GRINDING DEVICE, SUCH AS FOOD CHOPPERS
Filed June 11, 1923
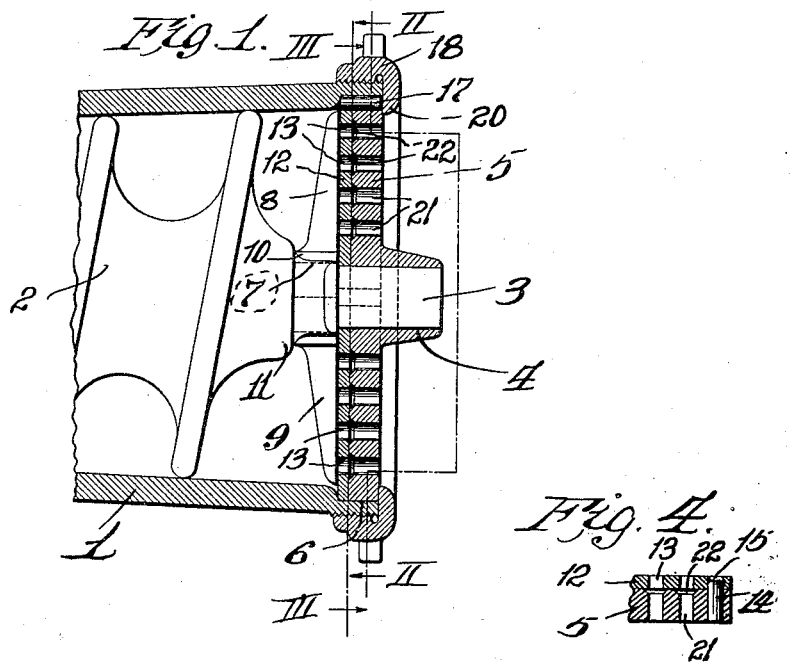
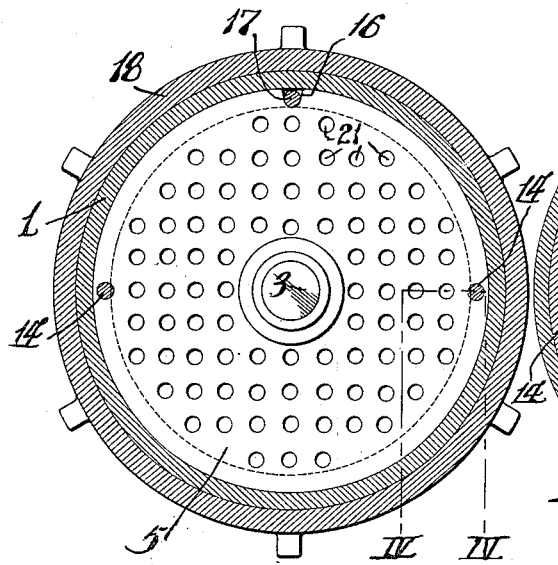
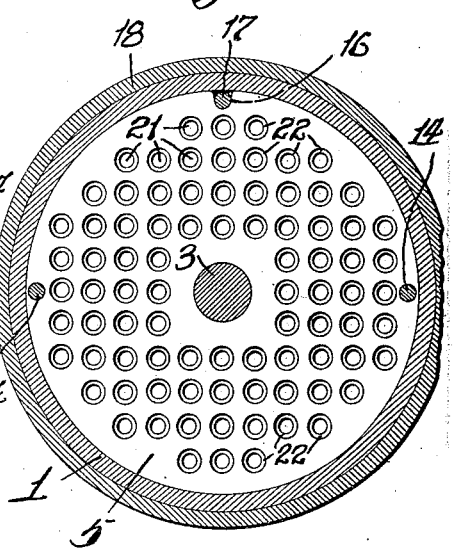
Inventor:
Arthur Tilden,
by H. G. Fletcher
His Attorney.

Patented Nov. 4, 1924.

1,514,271

UNITED STATES PATENT OFFICE.

ARTHUR TILDEN, OF ST. LOUIS, MISSOURI.

CUTTING AND GRINDING DEVICE, SUCH AS FOOD CHOPPERS.

Application filed June 11, 1923. Serial No. 644,629.

*To all whom it may concern:*

Be it known that I, ARTHUR TILDEN, a citizen of the United States of America, and a resident of the city of St. Louis and State of Missouri, have invented certain new and useful Improvements in Cutting and Grinding Devices, Such as Food Choppers, of which the following is a specification.

This invention relates to an improvement in cutting and grinding devices and has for its primary object the purpose of providing an improved arrangement of cutting edges to be used in connection with food choppers and the like.

Another object of the invention is in providing an improved cutting edge which is co-operable with the cutting blades of a food chopper which is reversible so that both sides of the cutting edge can be used.

Another object of the invention is in providing an improved double sided cutting edge in the form of a relatively thin plate or disk, for a food chopper of such a nature whereby both sides thereof can be used, and after the cutting edges thereof have become dull the plate can be thrown away and another cutting edge plate can be supplied.

Other and further objects will appear in the specification and be specifically pointed out in the appended claims, reference being had to the accompanying drawing, exemplifying the invention, and in which:—

Figure 1 is a fragmentary longitudinal vertical section taken through the discharge end of a food chopper showing this improved cutting edge or plate in use.

Figure 2 is an end elevation partly in section taken on the line II—II of Fig. 1.

Figure 3 is a vertical transverse section taken on the line III—III of Fig. 1.

Figure 4 is a fragmentary transverse section taken on the line IV—IV of Fig. 2.

Referring by numerals to the accompanying drawings, 1 designates a cylinder of a food chopper in which is located the spiral feed 2 which is provided with an end shaft 3.

The end shaft 3 is supported in a bearing 4 of a backing plate 5, the said plate being supported within the annular seat 6 which is formed in the discharge end of the cylinder 1.

The end shaft 3 adjacent the spiral feed 2 is provided with a squared seating portion 7, said seating portion being for the keying reception of a cutter 8 which is provided with a plurality of blades 9, the hub 10 of said cutter abutting against the hub 11 of the spiral feed 2.

Mounted between the backing plate 5 and the blades 9 of the cutter 8 is a cutting edge plate 12, said plate being relatively thin and provided with a plurality of apertures 13 the edge of each aperture on each side of the cutting edge plate 12 forming the cutting edges thereto.

The backing plate 5 is provided with a pair of oppositely disposed pins 14, each of said pins being adapted to be engaged within a respective opening 15, said openings being formed in the cutting edge plate 12.

In mounting the cutting edge plate 12 for co-operation with the cutter 8, the plate 12 is secured against the backing plate 5 by the pins 14, said plate 12 and the backing plate 5 being then mounted together over the end shaft 3 as shown in Fig. 1, said plate 12 and backing plate 5 each being provided with an alining notch 16, said notches adapted to be engaged over a projection or pin 17 which is extended from the cylinder 1 within the seat 6 at the upper end thereof. The projection 17 is for the purpose of preventing the backing plate 5 and cutting edge plate 12 from being turned.

After the mounting of the plates 5 and 12 as just described, an interiorly threaded tightening gland nut 18 is mounted over the threaded end 19 of the cylinder 1, the inwardly projecting flange 20 of said nut 18 bearing against the outer surface of the backing plate 5 thereby drawing the cutting edge plate 12 against the blades 9 of the cutter 8.

The main theme of this invention is to provide a renewable cutting edge plate which is reversible, said cutting edge plate being relatively thin so that after said cutting edge plate has become dull on each side, it can be thrown away and another cutting edge plate inserted.

Heretofore in the use of cutting devices such as food choppers, the backing plate 5 has been also used as the cutting edge plate, and when the plate has become dull it has to be reground on its wearing or inner face, and after two or three regrindings the plate becomes too thin and has to be thrown away. Even with the regrinding of the backing plates it has been found that the regrinding does not again fully recondition the cutting plate of the backing plate, the best cutting condition only being given when the backing plate is new.

Cutting edge plates of this improved character which are reversible as well as interchangeable have been found to fill a long felt want.

In the event that the perforations or apertures 13 of the cutting edge plate becomes staggered in the manufacture of such plates, in which the apertures will be somewhat offset from a true alinement with the perforations of the backing plate 5, each of the perforations 21 of said backing plate is provided with a bevel edge 22 for the purpose of providing communication with the staggered relation of the apertures 13 of the cutting edge plates 12.

What I claim is:—

1. In a cutting or grinding machine, the combination of a backing member provided with a series of beveled edged perforations, a rotary cutting element and a reversible cutting edge plate located between said member and said element, said plate having a series of perforations which communicate with the beveled edged side of the perforations of said backing member.

2. In a cutting or grinding machine, the combination of a perforated backing member, the perforations on one side of said member being beveled, a rotary cutting element, and a removable cutting edge plate provided with a series of perforations which are adapted to aline with the perforations of said member on their beveled sides.

3. In a cutting or grinding machine, the combination of a perforated backing member, the perforations of said member being beveled, a rotary cutting element, and a reversible cutting edge plate provided with a series of perforations which are adapted to aline with the beveled perforations of said member.

4. In a cutting or grinding machine, the combination of a perforated backing member having beveled edged perforations, a rotary cutting element, a reversible cutting edge plate provided with a series of perforations which are adapted to aline with the perforations of said member on their beveled sides, and means for securing said member and said plate together.

ARTHUR TILDEN.